United States Patent
Fahim et al.

(10) Patent No.: US 9,189,296 B2
(45) Date of Patent: Nov. 17, 2015

(54) CACHING AGENT FOR DEADLOCK PREVENTION IN A PROCESSOR BY ALLOWING REQUESTS THAT DO NOT DEPLETE AVAILABLE COHERENCE RESOURCES

(71) Applicant: INTEL CORPORATION, Santa Clara, CA (US)

(72) Inventors: Bahaa Fahim, San Jose, CA (US); Jeffrey Chamberlain, Tracy, CA (US); Yen-Cheng Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/142,137

(22) Filed: Dec. 27, 2013

(65) Prior Publication Data
US 2015/0186191 A1   Jul. 2, 2015

(51) Int. Cl.
*G06F 15/00* (2006.01)
*G06F 9/52* (2006.01)
*G06F 12/08* (2006.01)

(52) U.S. Cl.
CPC ............ *G06F 9/524* (2013.01); *G06F 12/0815* (2013.01); *G06F 12/0855* (2013.01)

(58) Field of Classification Search
CPC ...................................................... G06F 9/524
See application file for complete search history.

(56) References Cited

U.S. PATENT DOCUMENTS

| | | | | |
|---|---|---|---|---|
| 6,865,634 | B2 * | 3/2005 | McAllister | 710/240 |
| 7,600,080 | B1 * | 10/2009 | Bhattacharyya et al. | 711/143 |
| 7,668,979 | B1 * | 2/2010 | Wentzlaff | 710/33 |

* cited by examiner

*Primary Examiner* — Tammara Peyton
(74) *Attorney, Agent, or Firm* — International IP Law Group, P.L.L.C.

(57) ABSTRACT

Disclosed herein is a caching agent for preventing deadlock in a processor. The caching agent includes a receiver configured to receive a request from a core of the processor. The caching agent includes ingress logic coupled to the receiver to determine that the request is potentially a cacheable request. The ingress logic is to determine that the request does not deplete an available coherence resource. The ingress logic is to allow the request to be processed in response to the determination that the request does not deplete the available coherence resource.

25 Claims, 5 Drawing Sheets

CACHING AGENT FOR DEADLOCK PREVENTION IN A PROCESSOR BY ALLOWING REQUESTS THAT DO NOT DEPLETE AVAILABLE COHERENCE RESOURCES

TECHNICAL FIELD

The present disclosure is generally related to processing memory mapped input/output (MMIO) requests. More specifically, the present disclosure is related to allocating coherence resources for cacheable MMIO requests while preventing deadlock in a caching agent.

BACKGROUND

In a processor, caches may be used to hold copies of data from memory in order to shorten the latency of subsequent accesses to memory. In some scenarios, caches are shared across multiple entities in a processor, or processing system, that includes several integrated components. The caches may be used to cache data both from memory-mapped input/output devices (MMIO), such as data from stored on a hard disk or in a basic input output system (BIOS) read only memory (ROM), as well as from random access memory (RAM). During caching, a component or logic used to manage the caching may be referred to herein as a caching agent. In some scenarios, a caching agent may be subject to potential deadlock issues as it arbitrates between caching requests issued from various integrated components on the processor.

BRIEF DESCRIPTION OF THE FIGURES

The following detailed description may be better understood by referencing the accompanying drawings, which contain specific examples of numerous objects and features of the disclosed subject matter.

DETAILED DESCRIPTION

As discussed above, a caching agent may be exposed to a number of potential deadlock issues. The caching agent may arbitrate between requests issued from integrated components on the processor, which may include multiple cores as well as integrated input output (I/O) devices capable of performing direct memory accesses (DMA). The resources the caching agent has at its disposal for tracking these transactions through to their completion are finite, and as a result caching requests issued by a core or other integrated device will, in some scenarios, be required to wait until other requests complete and free up the existing resources for new caching requests. Further, the caching agent may be required to adhere to the interconnect protocols of the underlying fabric(s).

For example, the requirements of the Peripheral Component Interconnect Express (PCIE) protocol must be satisfied for any integrated PCIe devices that are issuing DMAs to the memory through the caching agent. Such an interconnect protocol may dictate that DMAs issued to the memory (which in the PCIe protocol example are referred to as posted requests) complete prior to any outstanding MMIO requests issued by the cores into an I/O domain. If there are no coherence resources available to process the posted requests in the caching agent, at a time when all the cores' coherent requests are accessing MMIO, then deadlock can occur. In other words, a posted request to DRAM may be a request issued by an I/O device to memory, and an MMIO request from a core may be a request issued to an I/O device. An I/O device may be both a receiver of MMIO requests as well as an initiator of requests to DRAM, and may result in a deadlock situation as discussed above.

The present disclosure describes a system and method for preventing situations that may result in deadlock in a processor. When a caching agent receives a request from a core in the processor, the caching agent can determine if the request is potentially a cacheable request. The caching agent can also determine if the potential cacheable request would deplete or use up all of the available coherence resources. If the cacheable request would not deplete the available coherence resources, then the cacheable request is allowed to process. Otherwise, the cacheable request is blocked, so that coherence resources are available for a posted request.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Figure 1:
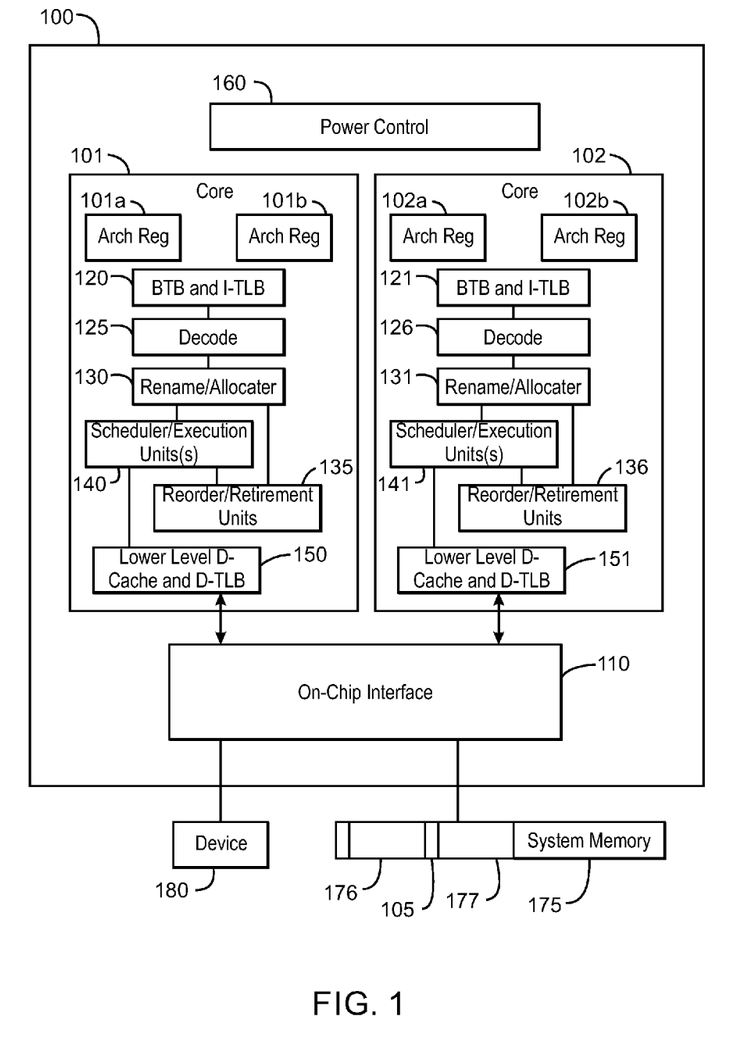
FIG. 1 illustrates an embodiment of a block diagram for a computing system including a multicore processor.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code.

Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. Here, each of the architecture state registers (101*a*, 101*b*, 102*a*, and 102*b*) may be referred to as processing elements, thread slots, or thread units, as described above. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in allocator and renamer block 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level caches are not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
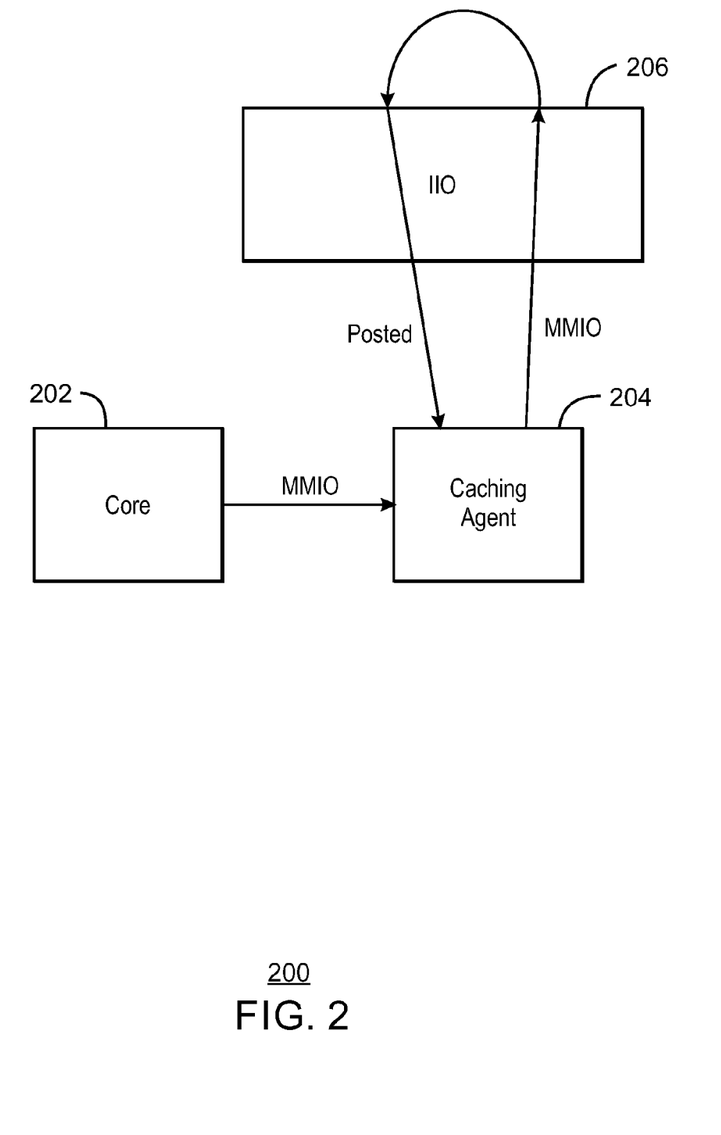
FIG. 2 is block diagram of a processor, in accordance with embodiments of the present disclosure.

FIG. 2 is a block diagram of a processor, in accordance with embodiments of the present disclosure. The processor 200 includes a core 202 communicatively coupled to a caching agent 204. The processor 200 may also include an integrated input/output (IIO) controller 206.

The core 202 can initiate a cacheable memory-mapped input/output request to the caching agent 204. The IIO controller 206 can also post a request to the caching agent 204. In some embodiments, interconnect protocol, such as Peripheral Component Interconnect Express ordering, dictates that requests from IIO be processed ahead of core-initiated requests.

To process either MMIO request or posted request, the caching agent acquires coherence resources. Examples of coherence resources include last level cache (LLC) ways and a table of outstanding requests (TOR) available to the caching agent. The LLC ways may be the ways of a shared set associative cache. It is noted that the embodiments described herein extend to other shared caches other than the LLC. If the MMIO request uses up remaining available coherence resources, the deadlock can occur, as the MMIO request cannot be completed before the posted request, and the post request cannot be completed due to lack of coherence resources.

To prevent deadlock, the caching agent 204 checks the availability of coherence resources before allowing the MMIO request to process. If processing the MMIO request would completely deplete the available coherence resources, then the MMIO request is blocked from processing until more coherence resources are available. If processing the MMIO request would still leave sufficient coherence resources to be used for posted requests, then the MMIO request is allowed to process.

Figure 3:
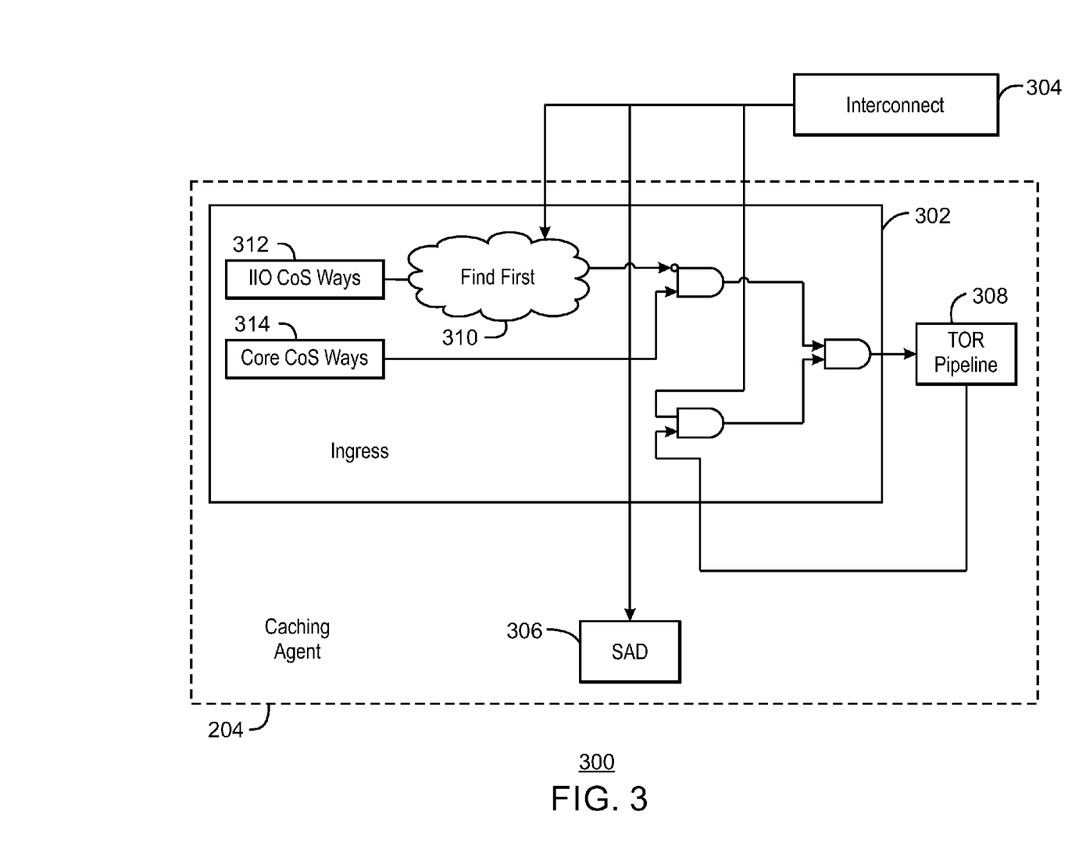
FIG. 3 is a block diagram of a caching agent of a processor, in accordance with embodiments of the present disclosure.

FIG. 3 is a block diagram of a caching agent of a processor, in accordance with embodiments of the present disclosure. The caching agent 204 can be a circuit or a chipset embedded on the processor 200. The caching agent 204 can include an ingress 302 to function as a gateway for a core-initiated request. The caching agent 204 can also include a system address decoder (SAD) 306 and a table of requests (TOR) pipeline 308.

The ingress 302 is configured to receive a request from a processor core 202 via an interconnect 304. The interconnect 304 may be an in-die interconnect (IDI). In some embodiments, a plurality of requests is received by the ingress 302 from the core 202. A find first module 310 on the ingress 302 can select the earliest core-initiated request.

The ingress 302 is configured to determine whether or not the request is potentially a cacheable MMIO request before the request is processed. In some embodiments, the core 202 can send a cacheable request while in an administrative mode. For example, the core 202 can send the cacheable request in system management mode (SMM). System management mode is an operating mode in which normal operations such as the operating system are suspended and special applications are executed in a high-privilege mode. The system address decoder 306 can detect that the request was sent in SMM, and determine that the request is potentially a cacheable request. In some embodiments, the ingress 302 can also determine that the request is a memory-mapped input/output (MMIO) request by querying the SAD/TOR pipeline.

The ingress 302 can check for whether or not the MMIO request would deplete available coherence resources. If processing the MMIO request would leave no coherence resources for posted requests from the IIO controller 206, then the MMIO request is blocked. The MMIO request is considered to "deplete" a coherence resource if the act of processing the MMIO request could inhibit a posted request from processing using the coherence resource. Coherence resources may include table of request (TOR) entries and last level cache (LLC) ways.

In some embodiments, the ingress 302 can access the TOR pipeline 308 to check the number of TOR entries available. If the TOR is nearly full, or there is only one TOR entry available, then the MMIO request is blocked. In some embodiments, the LLC ways are allocated into integrated input/output (110) class of service (CoS) ways 312, and core CoS ways 314. The allocation ensures that the MMIO request does not use an LLC way that is reserved for posted 110 requests. In some embodiments, the MMIO request is allowed to process if both of the following conditions are fulfilled:
 a. The MMIO request does not use the last available TOR entry.
 b. The MMIO request does not use an LLC way reserved for posted 110 requests.

If the ingress 302 determines that the MMIO request does not deplete the available coherence resources, then the MMIO request is allowed to process. The SAD 306 can be used to map the address space of the MMIO request. The MMIO request can be processed into the TOR pipeline 308.

Figure 4:
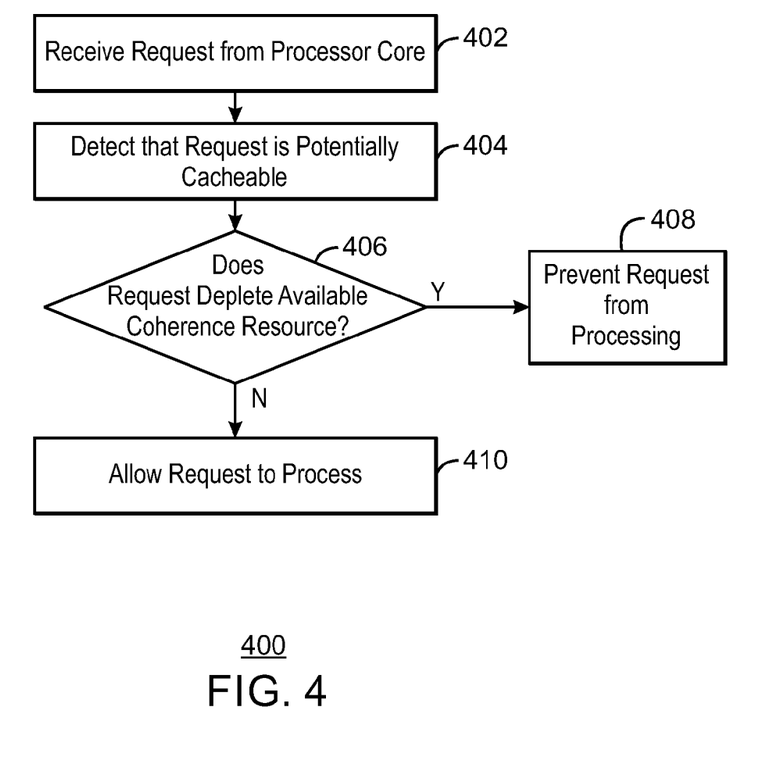
FIG. 4 is a process flow diagram of a method for preventing deadlock in a processor, in accordance with embodiments of the present disclosure.

FIG. 4 is a process flow diagram of a method for preventing deadlock in a processor, in accordance with embodiments of the present disclosure. The method 400 can be performed by a caching agent 204 of the processor 200, in accordance with embodiments described in FIGS. 2 and 3. At block 402, the caching agent receives a request from a core of the processor.

At block 404, the caching agent determines that the request is potentially cacheable. In some embodiments, the caching agent determines that the request was sent in an administrative mode, such as system management mode (SMM). The caching agent may determine whether the request is an MMIO request.

At block 406, the caching agent determines whether or not the request depletes an available coherence resource. The caching agent can check if the request would use the last available table of requests (TOR) entry. The caching agent can check if the request would use a last level cache (LLC) way that has been allocated and reserved for posted integrated input (110) requests.

If the request does deplete an available coherence resource, then the method 400 proceeds to block 408, where the caching agent prevents the request from processing. If the request does not deplete an available coherence resource, then the method 400 proceeds to block 410, where the caching agent allows the request to process.

Figure 5:
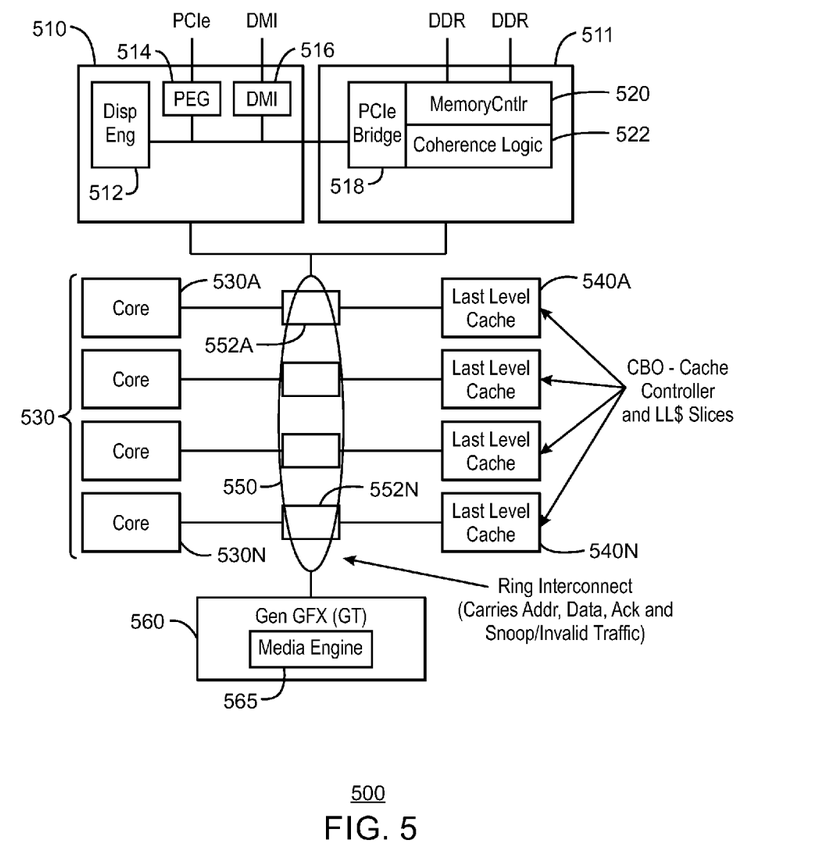
FIG. 5 illustrates an embodiment of a processor including an on-die interconnect.

Referring now to FIG. 5, shown is a block diagram of an embodiment of a multicore processor. As shown in the embodiment of FIG. 5, processor 500 includes multiple domains. Specifically, a core domain 530 includes a plurality of cores 530A-530N, a graphics domain 560 includes one or more graphics engines having a media engine 565, a system agent domain 510 such as a memory agent, and a Peripheral Component Interconnect Express (PCIE) agent domain 511.

In various embodiments, system agent domain 510, and in some embodiments PCIE agent domain 511, handles power control events and power management, such that individual units of domains 530 and 560 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 530 and 560 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 530 further includes low level caches in addition to various execution units and additional processing elements. Here, the various cores are coupled to each other and to a shared cache memory that is formed of a plurality of units or slices of a last level cache (LLC) 540A-540N; these LLCs often include storage and cache controller functionality and are shared amongst the cores, as well as potentially among the graphics engine too.

As seen, a ring interconnect 550 couples the cores together, and provides interconnection between the core domain 530, graphics domain 560 and system agent circuitry 510, via a plurality of ring stops 552A-552N, each at a coupling between a core and LLC slice. As seen in FIG. 5, interconnect 550 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 510 includes display engine 512 which is to provide control of and an interface to an associated display. System agent domain 510 may include other units, such as: an integrated memory controller 520 that provides for an interface to a system memory (e.g., a DRAM implemented with multiple DIMMs; coherence logic 522 to perform memory coherence operations. Multiple interfaces may be present to enable interconnection between the processor and other circuitry. For example, in one embodiment at least one direct media interface (DMI) 516 interface is provided as well as one or more PCIe™ interfaces 514. The display engine and these interfaces typically couple to memory via a PCIe™ bridge 518. Still further, to provide for communications between other agents, such as additional processors or other circuitry, one or more other interfaces (e.g. an Intel® Quick Path Interconnect (QPI) fabric) may be provided.

EXAMPLE 1

A caching agent is described herein. The caching agent may be used to reduce, or prevent deadlock on a processing means, such as a processor of a computing device. The caching agent may include a receiving means to receive a request from a core of the processor. The caching agent may include ingress logic, coupled to the receiver. The ingress logic may determine that the request is potentially a cacheable request, and determine that the request does not deplete an available coherence resource. The ingress logic may allow the request to be processed in response to the determination that the request does not deplete the available coherence resource.

EXAMPLE 2

A method for reducing deadlock in a processing means, such as a processor of a computing device is described herein. The method may include receiving a request from a core of the processor. The method includes determining that the request is potentially a cacheable request, and determining that the request does not deplete an available coherence resource. The request may be allowed to be processed in response to the determination that the request does not deplete the available coherence resource.

EXAMPLE 3

A processing means, such as a processing device, is described herein. The processing means may include a core, and a caching agent communicatively coupled to the core. The caching agent includes an ingress port including code, when executed, to cause the ingress port to receive a request from a core of the processor, and determine that the request is potentially a cacheable request. The ingress port may include code, that when executed by the processor will cause the ingress port to determine that the request does not deplete an available coherence resource, and allow the request to be processed in response to the determination that the request does not deplete the available coherence resource.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer). LOL Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A caching agent for reducing deadlock in a processor, comprising:
    a receiver to receive a request from a core of the processor to an input/output (I/O) device that will generate an I/O cache request;
    ingress logic coupled to the receiver to:
        determine that the request is potentially a cacheable request based on a detected state of the core indicated by the request;
        determine that the request does not deplete an available coherence resource; and
        allow the request to be processed in response to the determination that the request does not deplete the available coherence resource.

2. The caching agent of claim 1, the ingress logic to detect that the request is a memory-mapped input/output (MMIO) request.

3. The caching agent of claim 1, wherein the state comprises an administrative mode, further comprising a system address decoder (SAD) to detect that the request was made in the administrative mode.

4. The caching agent of claim 3, the SAD to detect that the request was made in system management mode (SMM).

5. The caching agent of claim 1, wherein the coherence resource is a table of requests (TOR) entry.

6. The caching agent of claim 1, wherein the coherence resource is a last level cache (LLC) way.

7. The caching agent of claim 1, comprising a table of requests (TOR) pipeline, wherein the processed request is to be allocated into the TOR pipeline.

8. A method for reducing deadlock in a processor, comprising:
  receiving a request from a core of the processor to an input/output (I/O) device that will generate an I/O cache request;
  determining that the request is potentially a cacheable request based on a detected state of the core indicated by the request;
  determining that the request does not deplete an available coherence resource; and
  allowing the request to be processed in response to the determination that the request does not deplete the available coherence resource.

9. The method of claim 8, comprising detecting that the request is a memory-mapped input/output (MMIO) request.

10. The method of claim 8, wherein the state comprises an administrative mode, further comprising detecting that the request was made in the administrative mode.

11. The method of claim 10, comprising detecting that the request was made in system management mode (SMM).

12. The method of claim 8, wherein the coherence resource is a table of requests (TOR) entry.

13. The method of claim 8, wherein the coherence resource is a last level cache (LLC) way.

14. A processor for reducing deadlock, comprising:
  a core;
  a caching agent communicatively coupled to the core, the caching agent comprising:
    an ingress port including code, when executed, to cause the ingress port to:
    receive a request from a core of the processor to an input/output (I/O) device that will generate an I/O cache request;
    determine that the request is potentially a cacheable request based on a detected state of the core indicated by the request;
    determine that the request does not deplete an available coherence resource; and
    allow the request to be processed in response to the determination that the request does not deplete the available coherence resource.

15. The processor of claim 14, the ingress port to detect that the request is a memory-mapped input/output (MMIO) request.

16. The processor of claim 14, wherein the state comprises an administrative mode, the caching agent comprising a system address decoder (SAD) to detect that the request was made in the administrative mode.

17. The processor of claim 16, the SAD to detect that the request was made in system management mode (SMM).

18. The processor of claim 14, wherein the coherence resource is a table of requests (TOR) entry.

19. The processor of claim 14, wherein the coherence resource is a last level cache (LLC) way.

20. The processor of claim 14, the caching agent comprising a table of requests (TOR) pipeline, wherein the processed request is to be allocated into the TOR pipeline.

21. A non-transitory computer readable medium including code, when executed, to cause a processor to perform operations, the operations, comprising:
  receiving a request from a core of the processor to an input/output (I/O) device that will trigger an I/O cache request;
  determining that the request is potentially a cacheable request based on a detected state of the core indicated by the request;
  determining that the request does not deplete an available coherence resource; and
  allowing the request to be processed in response to the determination that the request does not deplete the available coherence resource.

22. The non-transitory computer readable medium of claim 21, the operations comprising detecting that the request is a memory-mapped input/output (MMIO) request.

23. The non-transitory computer readable medium of claim 21, wherein the state comprises an administrative mode, the operations further comprising detecting that the request was made in an administrative mode including in system management mode (SMM).

24. The non-transitory computer readable medium of claim 21, wherein the coherence resource is a table of requests (TOR) entry.

25. The non-transitory computer readable medium of claim 21, wherein the coherence resource is a last level cache (LLC) way.

* * * * *